H. BENEDICT & B. A. F. GREER.
SCALE-BEAMS.

No. 195,432. Patented Sept. 18, 1877.

Witnesses:
Rich K Evans
F. B. Groff

Inventor
Heman Benedict
B. A. F. Greer
by their attys
A. H. Evans & Co.

UNITED STATES PATENT OFFICE.

HEMAN BENEDICT AND BENJAMIN A. F. GREER, OF MOUNT VERNON, OHIO.

IMPROVEMENT IN SCALE-BEAMS.

Specification forming part of Letters Patent No. 195,432, dated September 18, 1877; application filed September 20, 1876.

*To all whom it may concern:*

Be it known that we, HEMAN BENEDICT and BENJ. A. F. GREER, of Mount Vernon, Knox county and State of Ohio, have invented certain Improvements in Scale-Beams; and we hereby declare the following to be a full, clear, and exact description thereof, reference being had to the accompanying drawings, making part of this specification, in which—

Figure 1:
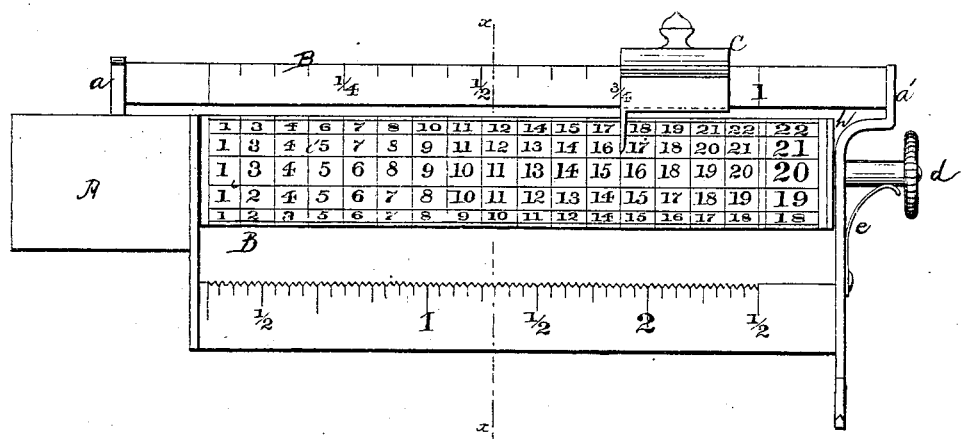
Figure 2:
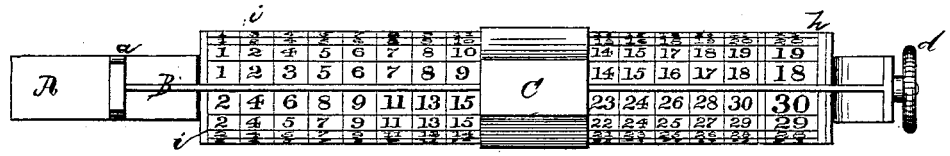
Figure 3:
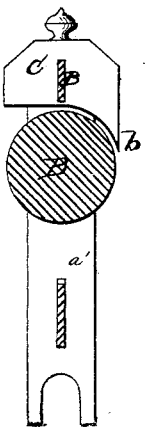

Figure 1 is a side elevation of my improved beam. Fig. 2 is a top view of the same, and Fig. 3 is a sectional view on line $x\ x$ of Fig. 1.

Our invention relates to that class of scale-beams on which a movable balance is used on a graduated bar; and the object is to provide a means for determining the cost of the article weighed at the same time the weight is ascertained.

Our invention consists in providing the scale-beam with a rotating drum, relatively arranged therewith, and provided with scales of prices corresponding to the scale of weights on scale-beam, the weight and the price being aligned by the sliding balance-weight, all as hereinafter fully described, and pointed out in the claim.

In the drawings, A is the lever, attached to the receptacle to hold the article to be weighed. B is the graduated projection, supported by standards $a\ a'$, and carrying the movable balance C, provided with a pointer, $b$. Below the bar B, and pivoted in the bar A and standard $a'$, is a rotating cylinder, D, divided by lines $i\ i'$ into certain divisions containing figures denoting price in relation to the weight. Around the circumference of the end $h$ of the cylinder, in large figures, are the prices of any given articles, to the greatest amount the beam B will indicate. From the end $h$ of the cylinder toward the other, between the lines $i\ i$ and $i'\ i'$, corresponding to the fractions of weight marked on the beam B, is marked a scale of prices for each fraction, and the price and weight are both seen at a glance. For example, a customer calls for three-fourths of a pound of salaratus, worth twenty-two cents per pound. The cylinder B, by means of handle $d$, is turned till the figures 30 are beneath the beam B; the weight $c$ is moved up to the three-quarter pound mark, (see Fig. 1,) and the price, seventeen cents, and weight are seen at a glance. In Fig. 2 the balance is supposed to be weighing one-half pound of an article worth thirty cents or dollars per pound—price fifteen dollars or fifteen cents.

This device is more particularly useful in the sale of given bulks of articles, the weights varying to small fractions, as butchers sell meat generally in market.

A spring, $e$, bears against handle $d$, so that it will be detained in place when turned to a particular point.

Having thus described our invention, what we claim as new, and desire to secure by Letters Patent, is—

The combination, with the graduated scale-beam B, standards $a\ a'$, and sliding balance-weight C, having pointer $b$, of the lever-bar A and revolving scale-priced cylinder D, journaled in bar A and standard $a'$, all constructed and arranged relatively to each other as herein shown and described, as and for the purpose specified.

HEMAN BENEDICT.
      BENJA. A. F. GREER.

Witnesses:
 WILLIAM B. DUNBAR,
 CHARLES S. PYLE.